United States Patent [19]

Brazell et al.

[11] Patent Number: 5,706,874

[45] Date of Patent: Jan. 13, 1998

[54] BISCUIT JOINER

[75] Inventors: Kenneth M. Brazell, Phoenix, Ariz.; Hiroshi Morikawa, Fuchu, Japan

[73] Assignee: Ryobi North America, Easley, S.C.

[21] Appl. No.: 794,119

[22] Filed: Feb. 3, 1997

[51] Int. Cl.$^6$ ............................................. B27M 1/00
[52] U.S. Cl. .................... 144/16.95; 144/154.5; 144/137; 409/182; 409/183
[58] Field of Search ................ 144/134.1, 136.95, 144/137, 154.5, 371; 409/181, 182, 183, 184, 218

[56] References Cited

U.S. PATENT DOCUMENTS

| | | | |
|---|---|---|---|
| 4,615,654 | 10/1986 | Shaw | 144/136.95 |
| 4,858,663 | 8/1989 | Bosten et al. | 144/136.95 |
| 4,909,680 | 3/1990 | Wolff | 144/136.95 |
| 4,913,204 | 4/1990 | Moores et al. | 144/136.95 |
| 4,942,912 | 7/1990 | Gakhar et al. | 144/136.95 |
| 4,971,122 | 11/1990 | Sato et al. | 144/136.95 |
| 5,257,654 | 11/1993 | Bean et al. | 144/136.95 |
| 5,273,091 | 12/1993 | Shibata | 144/136.95 |

OTHER PUBLICATIONS

Taunton's Find Wood Working, Feb., 1995, "Picking a Plate Joiner", pp. 52–57.
Wood Magazine Dec., 1992, "Buying a Biscuit Joiner", pp. 42–46.

*Primary Examiner*—W. Donald Bray
*Attorney, Agent, or Firm*—Brooks & Kushman P.C.

[57] ABSTRACT

A biscuit joiner for engaging a workpiece to form a slot sized to receive a carpentry biscuit is provided. The biscuit joiner has a base with a fence surface for engaging the workpiece. The fence surface has an elongated opening formed therein. A motor is fixed to the base, and has a drive shaft. A link has a first end pivotally mounted to the base, and a second end rotatably mounted to a rotary cutter blade. A drive mechanism connects the drive shaft to the rotary cutter blade. An actuator is operable to pivot the link relative to the base. Pivoting the link causes the rotary cutter blade to shift relative to the fence surface between a retracted position in which the rotary cutter blade is within the base, and an extended position in which the rotary cutter blade extends through the elongated opening in the fence surface to cut the workpiece. Alternatively, a slidable carriage is received on the base. The motor and rotary cutter blade are mounted to the carriage. The carriage is slidable relative to the base toward and away from the fence surface. The actuator is operable to slide the carriage to cause the rotary cutter blade to shift between the extended and retracted positions.

10 Claims, 3 Drawing Sheets

5,706,874

BISCUIT JOINER

TECHNICAL FIELD

The present invention relates to biscuit joiners.

BACKGROUND ART

Biscuit joiners, or plate joiners as they are sometimes referred to, are a commonly used tool for forming alignment slots in boards to be glued together. A biscuit, formed typically of plywood, is used to align a pair of board edges precisely during a gluing operation. Biscuits are used in conjunction with biscuit joiners in applications where dowel pins have historically been used. Biscuits offer a number of significant advantages over dowel pins, the most important of which is the ease of alignment when biscuits are used to align board edges in preparation for gluing.

In a conventional biscuit joiner assembly, a base has a planar fence surface for abutting the edge of the workpiece to be slotted. A drive motor is disposed in a housing, and drives a rotary cutter blade. The fence surface has an elongated opening, and the blade is engaged with the workpiece by manually moving the entire housing assembly toward the fence surface so that the cutter blade extends through the elongated slot.

A primary disadvantage associated with existing biscuit joiner assemblies is that in order to engage the rotary cutter blade with the workpiece, it is necessary to manually move the entire motor and housing assembly toward the fence surface as part of the cutting action. Therefore, only very light pressure can be placed against the stock prior to the cut.

SUMMARY OF THE INVENTION

It is, therefore, an object of the present invention to provide an improved biscuit joiner.

It is another object of the present invention to provide a biscuit joiner assembly which allows accurate cutting of slots without having to move the entire motor and housing assembly relative to the base to engage the workpiece with the rotary cutter blade.

In carrying out the above objects and other objects and features of the present invention, a biscuit joiner for engaging a workpiece to form a slot sized to receive a carpentry biscuit is provided. The biscuit joiner includes a base having a fence surface for engaging the workpiece. An elongated opening is formed in the fence surface. A link has a first end pivotally mounted to the base, and a second end having a rotary cutter blade rotatably mounted thereto. A motor is fixed to the base, and has a drive shaft connected by a drive mechanism to the rotary cutter blade.

An actuator is operatively connected to the link. The actuator is operable to pivot the link relative to the base to cause the rotary cutter blade to shift relative to the fence surface. The rotary cutter blade is shiftable between a retracted position wherein the rotary cutter blade is within the base, and an extended position wherein the rotary cutter blade extends through the elongated opening in the fence surface to cut the workpiece.

In an alternative embodiment of the present invention, a slidable carriage is received on the base. The motor and rotary cutter blade are mounted to the carriage. The carriage is slidable relative to the base toward and away from the fence surface. The actuator is operatively connected to the carriage, and operable to slide the carriage to cause the rotary cutter blade to shift between the extended and retracted positions.

The advantages accruing to the present invention are numerous. For example, the biscuit joiner of the present invention allows significant pressure to be applied to the main handle, forcing the fence up against the stock to be cut. With this pressure, the accuracy and alignment of the unit is assured prior to plunging the cutter and completing the cut. This allows accurate cutting of slots in the workpiece without having to manually move the entire motor and housing assembly toward the fence surface as part of the cutting action.

The above objects, and other objects, features and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

Figure 1:
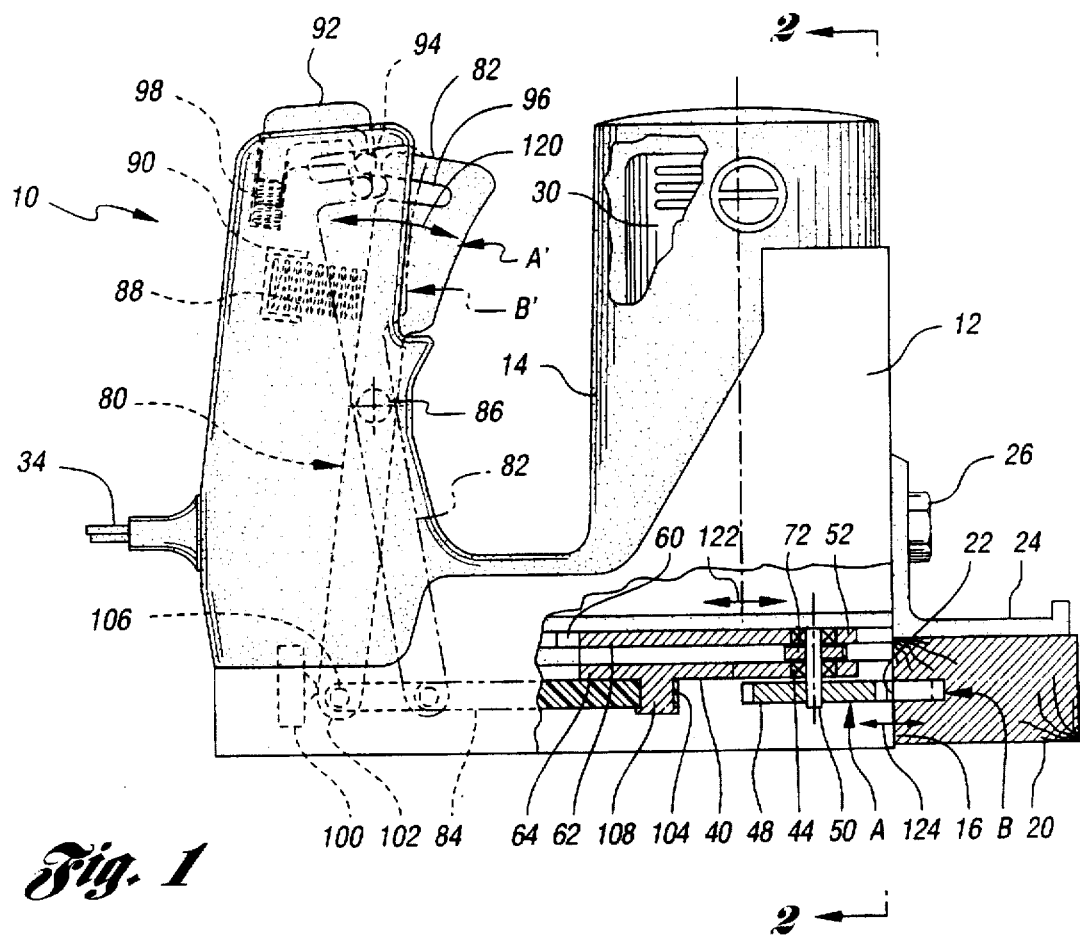
FIG. 1 is a side elevation, partially in section, of a biscuit joiner made in accordance with the present invention.
Figure 2:
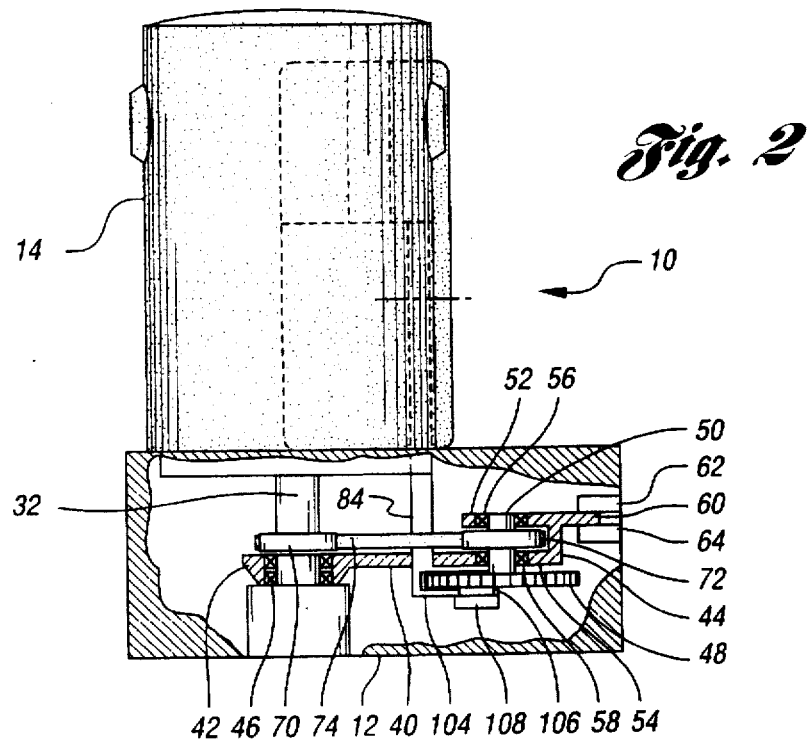
FIG. 2 is a front view of the biscuit joiner of FIG. 1, taken along line 2—2 of FIG. 1.
Figure 3:
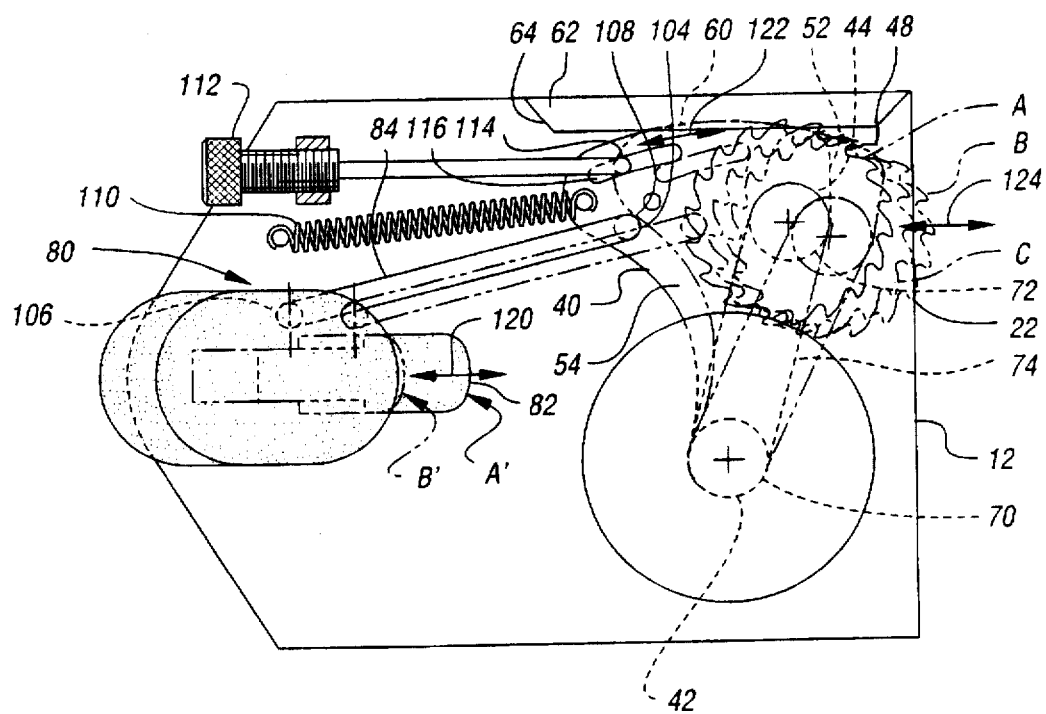
FIG. 3 is a top plan view of the biscuit joiner of FIG. 1.

Referring to FIGS. 1–3, a biscuit joiner made in accordance with the present invention is generally indicated at 10. Biscuit joiner 10 has a base 12 and a housing 14. The base 12 has a fence surface 16 for engaging a workpiece 20. An elongated opening 22 is formed in fence surface 16 and extends therethrough. The elongated opening 22 abuts workpiece 20 which is to be slotted. The elongated opening 22 is typically in the shape of an elongated slot.

An adjustable fence 24 is secured to the base 12 by an adjustment mechanism 26. The adjustment mechanism 26 enables a user of biscuit joiner 10 to vary the height of the adjustable fence 24 relative to the elongated opening 22.

A motor 30 is disposed in housing 14, and has a drive shaft 32. The motor 30 and housing 14 assembly is fixed to the base 12. An electrical cord 34 supplies power to the motor 30.

As best shown in FIG. 2, a link 40 has a first end 42 and a second end 44. First end 42 is pivotally mounted to the base 12 proximate drive shaft 32 on bearings 46. A rotary cutter blade 48 is rotatably mounted to the second end 44 of link 40. Rotary cutter blade 48 is mounted on an output shaft 50. Second end 44 of link 40 is depicted as being C-shaped with output shaft 50 passing through first and second portions 52 and 54, respectively, of second end 44 of link 40. Output shaft 50 is supported by bearings 56 and 58.

Link 40 has a guide edge 60 extending proximate the second end 44 of the link 40. A pair of spaced apart guide members 62 and 64 are fixed to the base, and receive the link guide edge 60 therebetween. The guide members 62 and 64 slidingly cooperate (FIG. 3) with the link guide edge 60 and support link guide edge 60 to steady the rotary cutter blade 48.

With continuing reference to FIGS. 2 and 3, a first pulley 70 is mounted on drive shaft 32, and a second pulley 72 is mounted on output shaft 50. First and second pulleys 70 and 72, respectively, are connected by a drive mechanism such as belt 74. It is to be appreciated that there are many suitable drive mechanism for connecting drive shaft 32 to the rotary cutter blade 48. For example, first and second gears could be mounted on the drive shaft 32 and output shaft 50, respectively, and an intermediate gear could be mounted on link 40 to connect the gears to drive the rotary cutter blade 48.

An actuator 80 is operatively connected to the link 40, and is operable to pivot the link 40 relative to the base 12 on bearing 46. As the link pivots, the rotary cutter blade 48 shifts relative to the fence surface 16 between a retracted position indicated at A and an extended position indicated at B. In the retracted position A, the rotary cutter blade 48 is within the base 12. In the extended position B, the rotary cutter blade 48 extends through the elongated opening 22 in fence surface 16 and into workpiece 20.

It is to be appreciated that there are many suitable actuator arrangements for pivoting link 40 that would be apparent to one of ordinary skill in the art.

As best shown in FIGS. 1 and 3, actuator 80 is shown as a lever 82 cooperating with a push rod 84. The lever 82 is operable by a user, and pivots about a pivotal connection 86 fixed to housing 14. A spring 88 mounted on a spring seat 90 within housing 14 urges lever 82 toward a deasserted position indicated at A' corresponding to the retracted position A of the rotary cutter blade 48. The lever 82 is maintained in the deasserted position A' by a lockout switch 92.

The lever 82 can be moved from the deasserted position A' to an asserted position indicated at B' by first moving lockout switch 92 so that pin 94 is adjacent slot 96 on lever 82, against the bias of spring 98, and then pressing lever 82 against the bias of spring 88. A microswitch 100, for selectively supplying power to motor 30, contacts an end 102 of lever 82 when lever 82 is in the deasserted position A'. When lever 82 is pressed, end 102 moves away from microswitch 100, and turns on motor 30.

Push rod 84 has a first end 104, and a second end 106. First end 104 is connected to link 40 at pivotal connection 108, and the second end 106 is connected to end 102 of lever 82. A tensile spring 110 biases link 40 to maintain the rotary cutter blade 48 in the retracted position A.

A depth of cut adjustment mechanism 112 cooperates with the link 40 to selectively limit the pivoting of the link 40 relative to the base 12. Adjustment mechanism 112 is a conventional spring and cam arrangement having a hook stop 114 which engages link 40 at arcuate slot 116. Adjustment mechanism 112 allows selective positioning of hook stop 114. This provides a plurality of extended positions for rotary cutter blade 48 for forming differently sized slots. For example, an extended position indicated at C (FIG. 3) may be achieved by adjusting depth of cut adjustment mechanism 112 accordingly.

With continuing reference to FIGS. 1–3, operation of biscuit joiner 10 will now be described. Actuation of lever 82 from deasserted position A' to asserted position B' pivots lever 82 about pivot connection 86 along arrow 120. When end 102 of lever 82 moves off of microswitch 100, motor 30 is turned on. Push rod 84 connects end 102 of lever 82 to link 40. As lever 82 pivots toward asserted position B', link 40 pivots along arrow 122, and subsequently shifts rotary cutter blade 48 from the retracted position A, to the extended position B along arrow 124.

Figure 4:
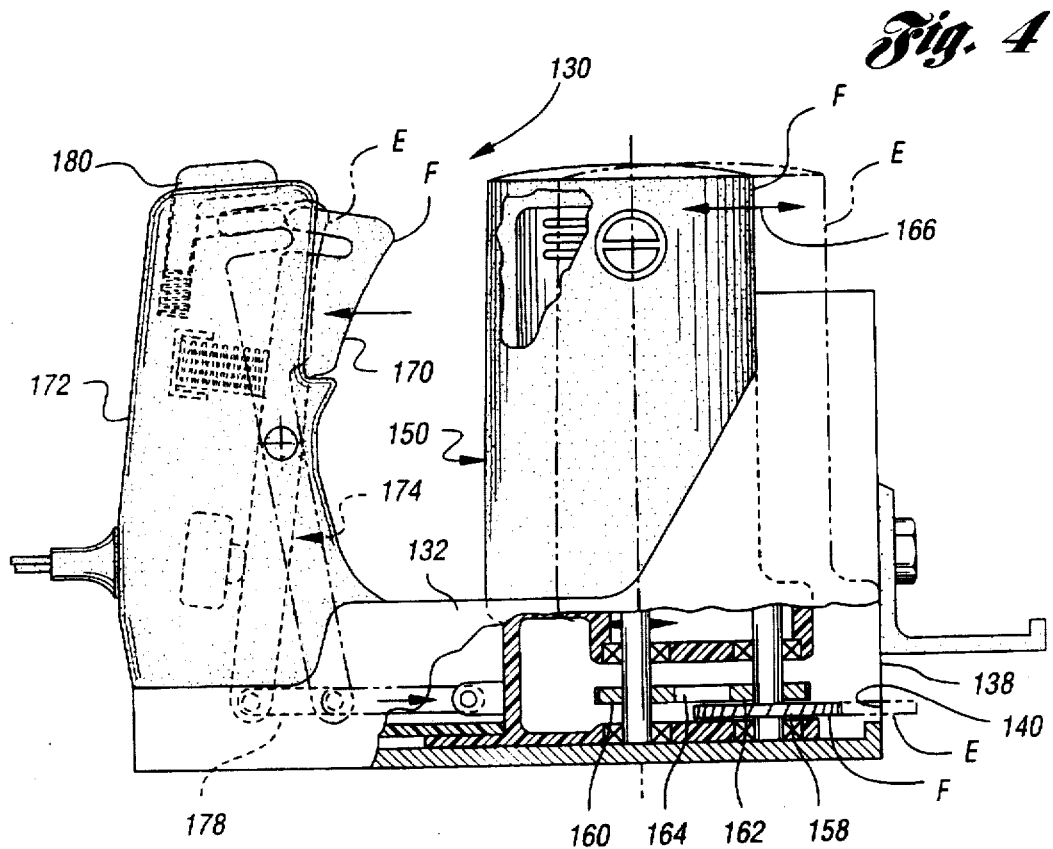
FIG. 4 is a side elevation, partially in section, of an alternative biscuit joiner embodiment.
Figure 5:
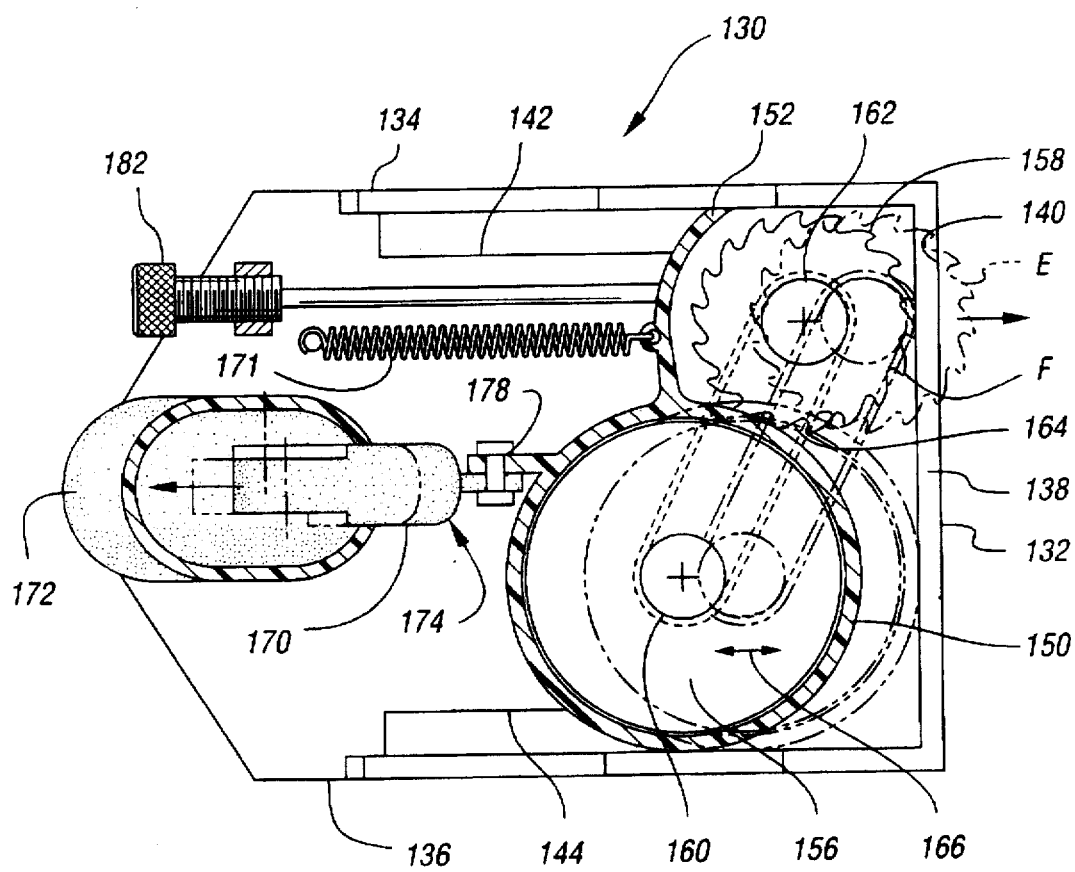
FIG. 5 is a top plan view of the alternative embodiment of FIG. 4.

With reference to FIGS. 4 and 5, an alternative embodiment of the biscuit joiner of the present invention is generally indicated at 130. The biscuit joiner 130 has a base 132 having a pair of sides 134 and 136, and a fence surface 138. The fence surface 138 has an elongated opening 140. A pair of rails 142 and 144 are located on the base sides 134 and 136, respectively.

A slidable carriage 150 is received on the base 132. Sides 152 and 154 of the carriage 150 slidingly cooperate with rails 142 and 144, respectively. The motor 156 is fixed to the carriage 150, and rotary cutter blade 158 is rotatably mounted to the carriage 150. First and second pulleys 160 and 162, respectively, and belt 164 are arranged to drive rotary cutter blade 158. The carriage 150 is slidable relative to the base 132 toward and away from the fence surface 138 along arrow 166. Lever 170 is operatively connected to the carriage 150, and operable to slide the carriage 150 to cause the rotary cutter blade 158 to shift between the extended position indicated at E, and the retracted position indicated at F. Tensile spring 171 biases the carriage 150 to maintain rotary cutter blade 158 in the retracted position F.

It is to be appreciated that there are many suitable actuator arrangements for sliding the carriage 150 that would be apparent to one of ordinary skill in the art. In the alternative embodiment illustrated, biscuit joiner 130 is provided with a handle 172 affixed to the base 132. An actuator 174 is formed by lever 170 and push rod 178. In use, the operator will depress lock out button 180 while holding handle 172, and squeeze lever 170 to advance carriage 150 causing rotary cutter blade 158 to project through elongated opening 140.

With continuing reference to FIGS. 4 and 5, the biscuit joiner 130 has a depth of cut adjustment mechanism generally indicated at 182 which operates as previously described to selectively limit the sliding of carriage 150 relative to the base. This provides a plurality of selectable extended positions for the rotary cutter blade.

While the best mode for carrying out the invention has been described in detail, those familiar with the art to which this invention relates will recognize various alternative designs and embodiments for practicing the invention as defined by the following claims.

What is claimed is:

1. A biscuit joiner for engaging a workpiece to form a slot sized to receive a carpentry biscuit, the biscuit joiner comprising:

a base having a fence surface for engaging the workpiece, the fence surface having an elongated opening formed therein;

a motor fixed to the base, the motor having a drive shaft;

a link having first and second ends, the first end being pivotally mounted to the base;

a rotary cutter blade rotatably mounted to the second end of the link;

a drive mechanism connecting the drive shaft to the rotary cutter blade to drive the rotary cutter blade; and an actuator operatively connected to the link, the actuator being operable to pivot the link relative to the base to cause the rotary cutter blade to shift relative to the fence surface between a retracted position wherein the rotary cutter blade is within the base, and an extended position wherein the rotary cutter blade extends through the elongated opening in the fence surface.

2. The biscuit joiner of claim 1 wherein the link has a guide edge extending proximate the second end of the link, the biscuit joiner further comprising:

a pair of spaced apart guide members fixed to the base, the guide members receiving the link guide edge therebetween, the guide members slidingly cooperating with the link guide edge and supporting the link guide edge to steady the rotary cutter blade.

3. The biscuit joiner of claim 1 further comprising:

a depth of cut adjustment mechanism cooperating with the link to selectively limit the pivoting of the link relative to the base to provide a plurality of extended positions for the rotary cutter blade for forming differently sized slots.

4. The biscuit joiner of claim 1 wherein the actuator comprises:

a lever operable by a user; and a push rod having first and second ends, the first end being connected to the link, and the second end being connected to the lever to cause the link to pivot relative to the base and shift the rotary cutter blade to the extended position when the lever is operated by the user.

5. A biscuit joiner for engaging a workpiece to form a slot sized to receive a carpentry biscuit, the biscuit joiner comprising:

a base having a fence surface for engaging the workpiece, the fence surface having an elongated opening formed therein;

a motor fixed to the base, the motor having a drive shaft;

a link having first and second ends, the first end being pivotally mounted to the base;

a rotary cutter blade rotatably mounted to the second end of the link;

a drive mechanism connecting the drive shaft to the rotary cutter blade to drive the rotary cutter blade;

a lever operable by a user; and a push rod having first and second ends, the first end being connected to the link, the second end being connected to the lever, the lever being operable to pivot the link relative to the base to cause the rotary cutter blade to shift relative to the fence surface between a retracted position wherein the rotary cutter blade is within the base, and an extended position wherein the rotary cutter blade extends through the elongated opening in the fence surface.

6. The biscuit joiner of claim 5 wherein the link has a guide edge proximate the second end of the link, the biscuit joiner further comprising:

a pair of spaced apart guide members fixed to the base, the guide members receiving the link guide edge therebetween, the guide members slidingly cooperating with the link guide edge and supporting the link guide edge to steady the rotary cutter blade.

7. The biscuit joiner of claim 5 further comprising:

a depth of cut adjustment mechanism cooperating with the link to selectively limit the pivoting of the link relative to the base to provide a plurality of extended positions for the rotary cutter blade for forming differently sized slots.

8. A biscuit joiner for engaging a workpiece to form a slot sized to receive a carpentry biscuit, the biscuit joiner comprising:

a base having a fence surface for engaging the workpiece, the fence surface having an elongated opening formed therein;

a slidable carriage received on the base, the carriage being slidable relative to the base toward and away from the fence surface;

a motor fixed to the carriage, the motor having a drive shaft;

a rotary cutter blade rotatably mounted on the carriage;

a drive mechanism connecting the drive shaft to the rotary cutter blade to drive the rotary cutter blade; and an actuator operatively connected to the carriage, the actuator being operable to slide the carriage relative to the base toward and away from the fence surface to cause the rotary cutter blade to shift relative to the fence surface between a retracted position wherein the rotary cutter blade is within the base, and an extended position wherein the rotary cutter blade extends through the elongated opening in the fence surface.

9. The biscuit joiner of claim 8 further comprising:

a depth of cut adjustment mechanism cooperating with the carriage to selectively limit the sliding of the carriage relative to the base to provide a plurality of extended positions for the rotary cutter blade for forming differently sized slots.

10. The biscuit joiner of claim 8 wherein the actuator comprises:

a lever operable by a user; and a push rod having first and second ends, the first end being connected to the carriage, and the second end being connected to the lever to cause the carriage to slide relative to the base and shift the rotary cutter blade to the extended position when the lever is operated by the user.

* * * * *